(12) United States Patent
Huang et al.

(10) Patent No.: US 9,946,310 B1
(45) Date of Patent: Apr. 17, 2018

(54) HINGE AND ELECTRONIC DEVICE USING THE SAME

(71) Applicant: SHIN ZU SHING CO., LTD., New Taipei (TW)

(72) Inventors: Wei-Jung Huang, New Taipei (TW); Jui-Lin Chu, New Taipei (TW); Kuo-Jung Hsu, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 0 days.

(21) Appl. No.: 15/685,003

(22) Filed: Aug. 24, 2017

(51) Int. Cl.
G06F 1/16 (2006.01)
H04M 1/02 (2006.01)
E05D 3/06 (2006.01)
E05D 11/06 (2006.01)

(52) U.S. Cl.
CPC ............. G06F 1/1681 (2013.01); *E05D 3/06* (2013.01); *E05D 11/06* (2013.01); *G06F 1/1616* (2013.01); *H04M 1/0216* (2013.01)

(58) Field of Classification Search
None
See application file for complete search history.

(56) References Cited

U.S. PATENT DOCUMENTS 6,223,393 B1 * 5/2001 Knopf ................... G06F 1/1618
 16/366
8,125,759 B2 * 2/2012 Fukuma ................. F16G 13/18
 248/349.1
8,971,032 B2 * 3/2015 Griffin .................. G06F 1/1652
 345/156
9,801,290 B2 * 10/2017 Ahn ...................... H05K 5/0017
9,869,114 B1 * 1/2018 Hung ........................ E05D 3/18
2012/0044620 A1 * 2/2012 Song ....................... G06F 1/1616
 361/679.01
2014/0196254 A1 * 7/2014 Song .......................... E05D 3/14
 16/302
2015/0362956 A1 * 12/2015 Tazbaz .................. G06F 1/1637
 361/679.27
2016/0205579 A1 * 7/2016 Cheng ................... H04L 5/0057
 370/252

* cited by examiner

*Primary Examiner* — Courtney Smith
*Assistant Examiner* — Rashen E Morrison
(74) *Attorney, Agent, or Firm* — Alan D. Kamrath; Kamrath IP Lawfirm, P.A.

(57) ABSTRACT

A hinge includes connection members, a first fixing member, a second fixing member, a first axle, a second axle, and a third axle. Each connection member includes a first slide block, a second arc surface, a first arc surface, and a second slide block. A first circular hole penetrates through the first slide block. A first arc hole penetrates through the second slide block. The first fixing member includes a third arc surface and a third slide block with a second arc hole. The second fixing member includes a fourth slide block with a second circular hole and a fourth arc surface. The first axle passes through the second arc hole and the first circular hole. The second axle passes through the second circular hole and the first arc hole. The third axle passes through the first circular hole and the first arc hole.

13 Claims, 9 Drawing Sheets

HINGE AND ELECTRONIC DEVICE USING THE SAME

FIELD OF THE INVENTION

The present invention relates to an electronic device, and more particularly, to a hinge and an electronic device using the same.

BACKGROUND OF THE INVENTION

There is an electronic device which includes a flexible display member and two plates hinged to each other. The flexible display member is disposed on one face of the two plates. The two plates and the flexible display member are assembled into a foldable display device. However, the flexible display member itself has a thickness. While the flexible display member is spread to 180 degrees or folded to 0 degrees along with the plates being spread or folded relatively, the flexible display member may be over stretched or loosed. For example, in a case that the flexible display member is configured to be attached on the two plates evenly and adequately while the two plates are spread to 180 degrees, the flexible display member would be over stretched by the two plates while the two plates are folded to 0 degrees. Under the circumstances, the flexible display member may be damaged. In a case that the flexible display member is configured to be attached on the two plates evenly and adequately while the two plates are folded to 0 degrees, the flexible display member would be over loosed due to the lack of stretching force while the two plates are spread to 180 degrees. Under the circumstances, the flexible display member may hump, and the effect of presenting images is not well.

SUMMARY OF THE INVENTION

To address the above drawbacks, the present invention aims to provide a hinge and an electronic device using the same. While two plates of the electronic device are folded or spread relatively, a flexible display member attached to the two plates wouldn't be over stretched or loosed.

In an embodiment of the present invention, a hinge includes a connection member, a first fixing member, a second fixing member, a first axle, and a second axle. The connection member includes a first side and a second side opposite with each other. A first slide block is formed on a first position of the first side. A first arc surface is formed on the second side opposite with the first position. A second arc surface is formed on a second position of the first side. A second slide block is formed on the second side opposite with the second position. A first circular hole penetrates through the first slide block. A first arc hole penetrates through the second slide block. The first fixing member includes a third side. A third arc surface corresponding to the first slide block is formed on the third side opposite with the first position. A third slide block corresponding to the second arc surface is formed on the third side opposite with the second position. A second arc hole penetrates through the third slide block. The second fixing member includes a fourth side. A fourth slide block corresponding to the first arc surface is formed on the fourth side opposite with the first position. A fourth arc surface corresponding to the second slide block is formed on the fourth side opposite with the second position. A second circular hole penetrates through the fourth slide block. The first axle passes through the second arc hole and the first circular hole. The second axle passes through the second circular hole and the first arc hole. While the first fixing member and the connection member rotate relatively by the second arc hole, a third top edge of the third side of the first fixing member abuts against a first top edge of the first side of the connection member; while the second fixing member and the connection member rotate relatively by the first arc hole, a fourth top edge of the fourth side of the second fixing member abuts against a second top edge of the second side of the connection member.

In an embodiment of the present invention, a hinge includes a plurality of connection members, a first fixing member, a second fixing member, a first axle, a second axle, and a third axle. Each of the connection members includes a first side and a second side opposite with each other. A first slide block is formed on a first position of the first side. A first arc surface is formed on the second side opposite with the first position. A second arc surface is formed on a second position of the first side. A second slide block is formed on the second side opposite with the second position. A first circular hole penetrates through the first slide block. A first arc hole penetrates through the second slide block. The first fixing member includes a third side. A third arc surface corresponding to the first slide block is formed on the third side opposite with the first position. A third slide block corresponding to the second arc surface is formed on the third side opposite with the second position. A second arc hole penetrates through the third slide block. The second fixing member includes a fourth side. A fourth slide block corresponding to the first arc surface is formed on the fourth side opposite with the first position. A fourth arc surface corresponding to the second slide block is formed on the fourth side opposite with the second position. A second circular hole penetrates through the fourth slide block. The first axle passes through the second arc hole of the first fixing member and the first circular hole of the corresponding connection member. The second axle passes through the second circular hole of the second fixing member and the first arc hole of the corresponding connection member. The third axle passes through the first circular hole and the first arc hole of each adjacent two of the connection members. While the first fixing member and the corresponding connection member rotate relatively by the second arc hole, a third top edge of the third side of the first fixing member abuts against a first top edge of the first side of the corresponding connection member; while the second fixing member and the corresponding connection member rotate relatively by the first arc hole, a fourth top edge of the fourth side of the second fixing member abuts against a second top edge of the second side of the corresponding connection member; and while each adjacent two of the connection members rotate relatively by the first arc hole, the first top edge of the first side and the second top edge of the second side of each adjacent two of the connection members abut against each other.

In an embodiment of the present invention, an electronic device includes the hinge, a first plate, and a second plate. The first plate is fixed to the first fixing member. The second plate is fixed to the second fixing member.

Concisely, according to the hinge and the electronic device using the same of the embodiments of the present invention, while the first plate and the second plate of the electronic device are folded and spread relatively, a length of an outer periphery of the connection member(s) of the hinge remains the same, such that there would be no influence to a flexible display member attached to the first plate, the second plate, and the outer periphery of the connection member(s). Such influences, for example, may result in the flexible display member being over stretched to cause damage or the flexible display member being over loosed to hump to negatively affect the displaying.

The features of the present invention will no doubt become understandable to those of ordinary skill in the art after reading the following detailed description of the preferred embodiment that is illustrated in the various figures and drawings.

DETAILED DESCRIPTION OF ILLUSTRATIVE EMBODIMENTS

Figure 1:
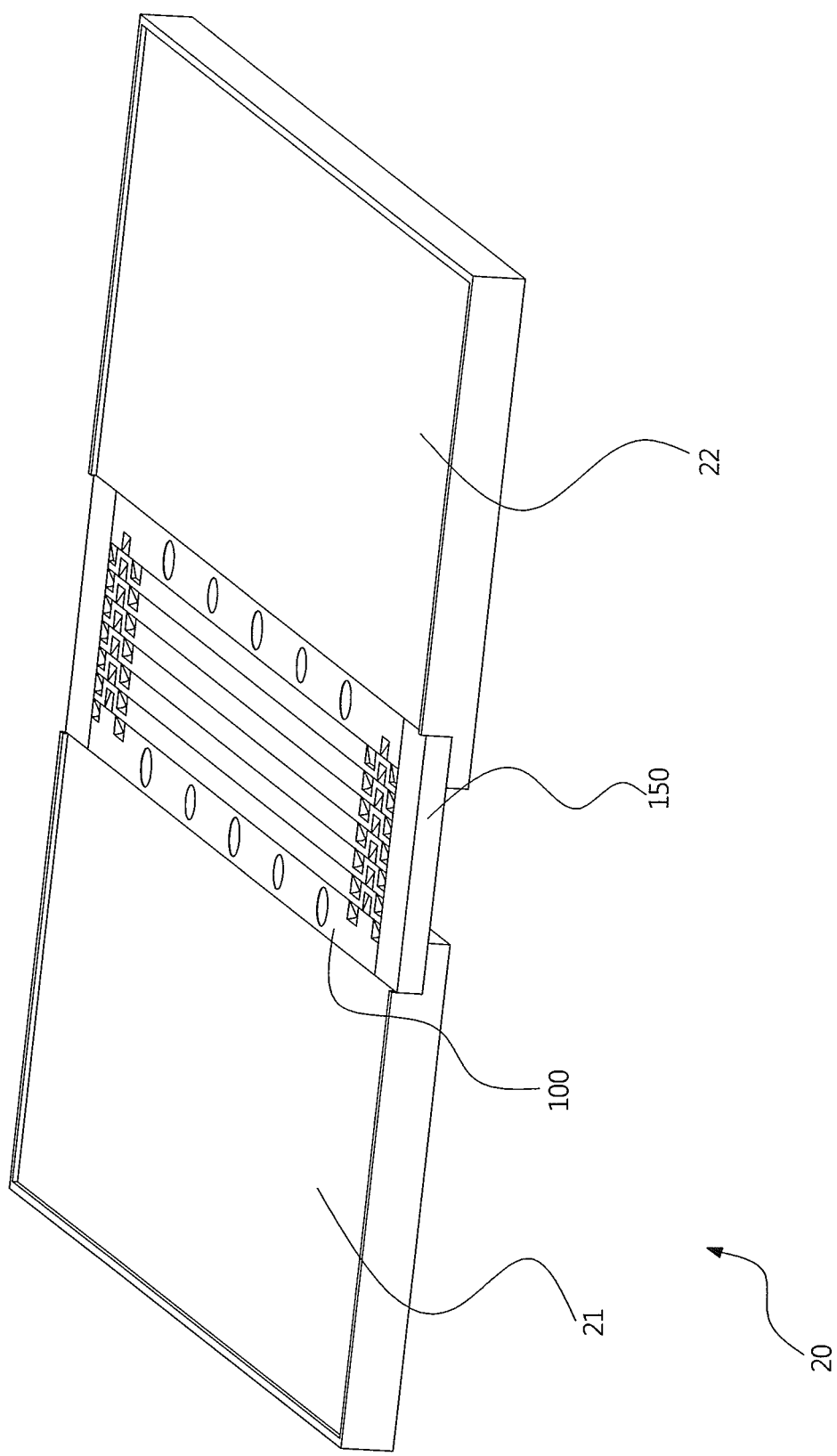
FIG. 1 illustrates a perspective view of an electronic device at 180 degrees according to an embodiment of the present invention.
Figure 7:
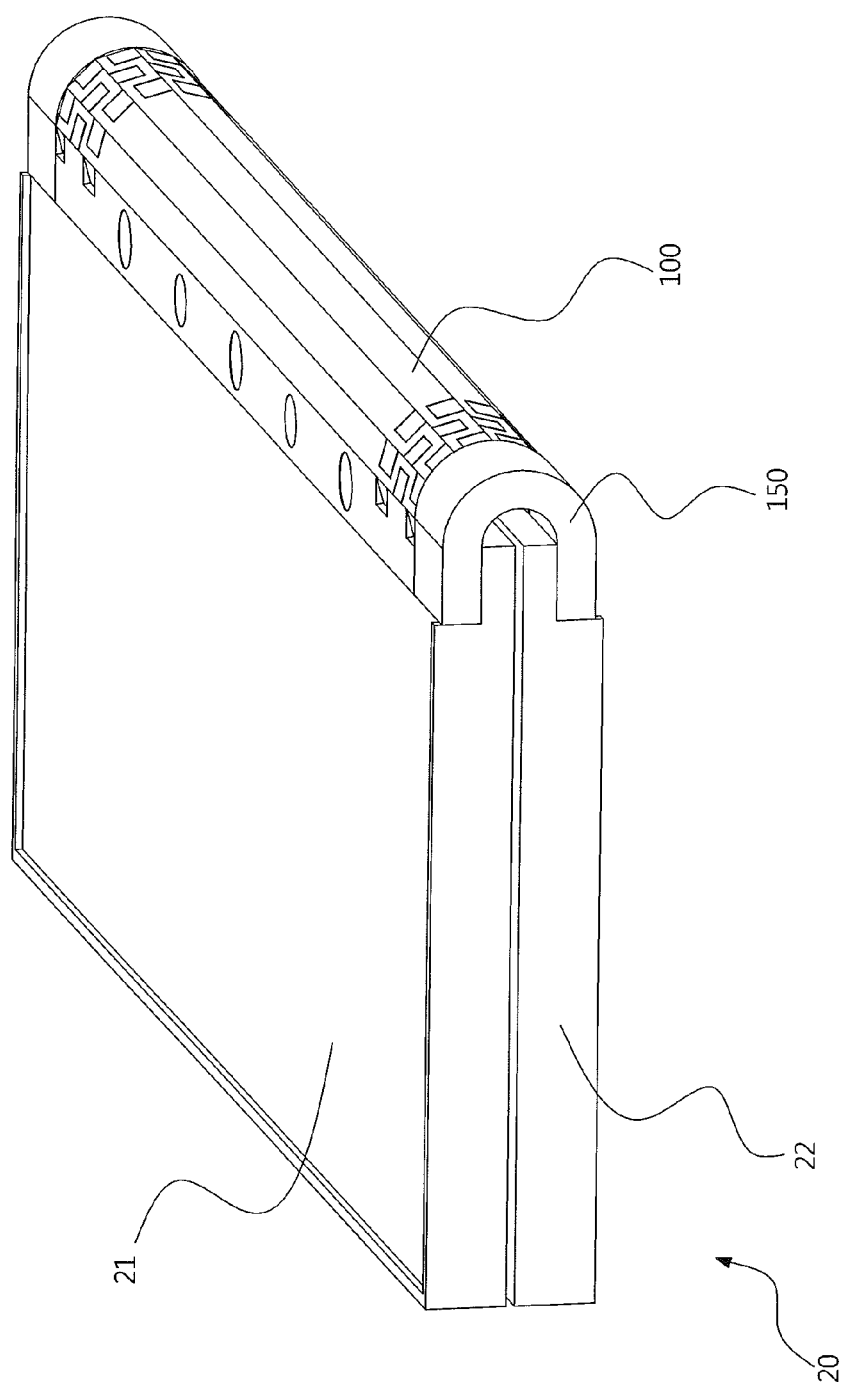
FIG. 7 illustrates a perspective view of the electronic device of FIG. 1 at 0 degrees.

Please refer to FIG. 1 and FIG. 7. FIG. 1 illustrates a perspective view of an electronic device 20 at 180 degrees according to an embodiment of the present invention. FIG. 7 illustrates a perspective view of the electronic device 20 of FIG. 1 at 0 degrees. The electronic device 20 includes a hinge 100, a first plate 21, and a second plate 22. The hinge 100 is between the first plate 21 and the second plate 22. The first plate 21 and the second plate 22 can be folded from 180 degrees to 0 degrees by the hinge 100 (as shown in FIG. 1) or spread from 0 degrees to 180 degrees (as shown in FIG. 7). In the embodiment, the electronic device 20 is a foldable display device and can be provided with a flexible display member (not shown). The flexible display member is attached to the first plate 21, the second plate 22, and a face (an upper face as shown in FIG. 1) of an outer periphery of the hinge 100 and can be relatively folded or spread along with the first plate 21 and the second plate 22. In the embodiment, two opposite sides of the hinge 100 (a front side and a rear side as shown in FIG. 1) are symmetrical in structure. The following illustration relates to one of the two sides. The structure of the other one of the two sides is the same as the structure of the illustrated one of the two sides, and there is no need to go into details.

Figure 2:
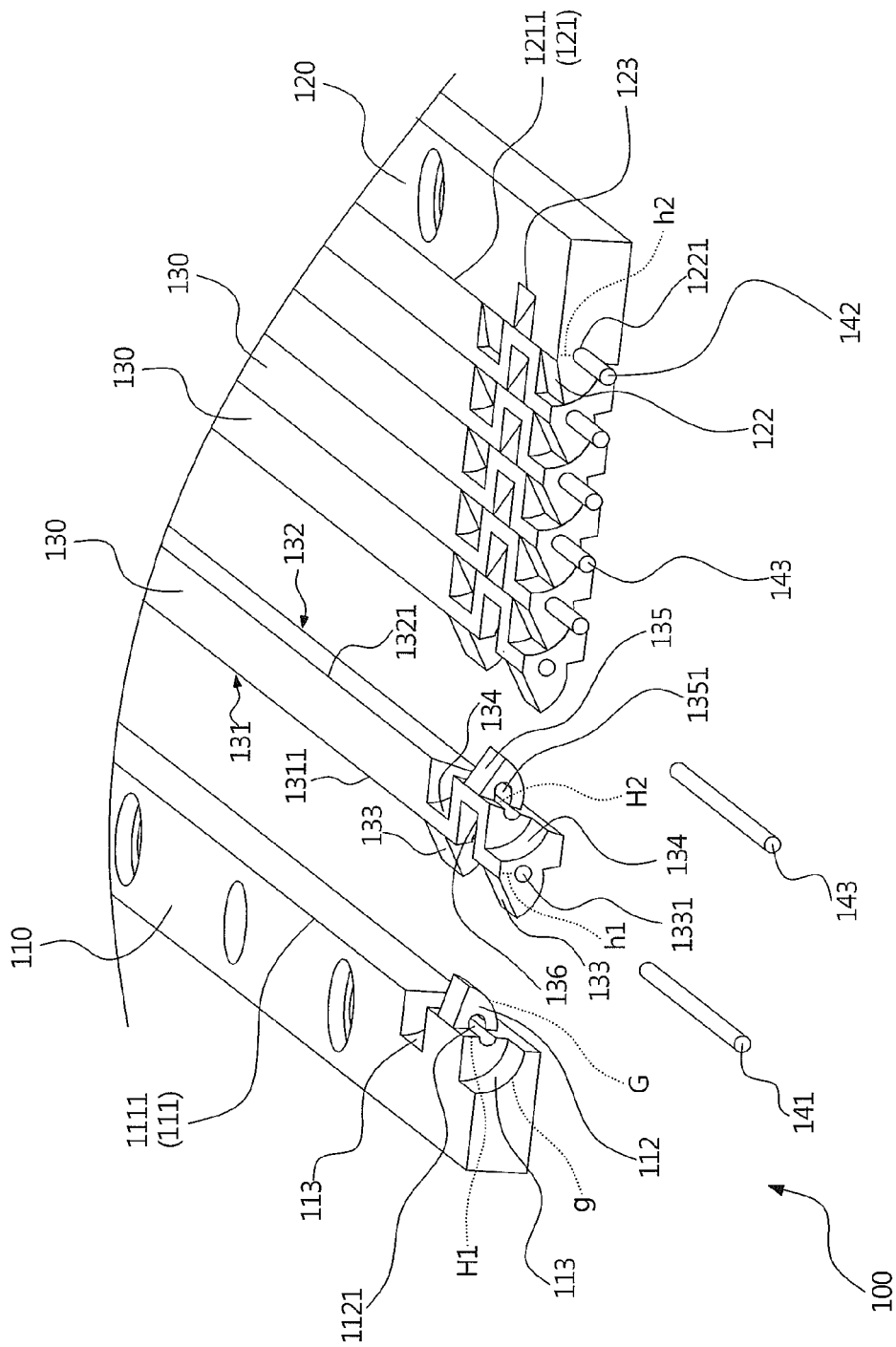
FIG. 2 illustrates an exploded view of a hinge of the electronic device of FIG. 1 at 180 degrees.
Figure 3:
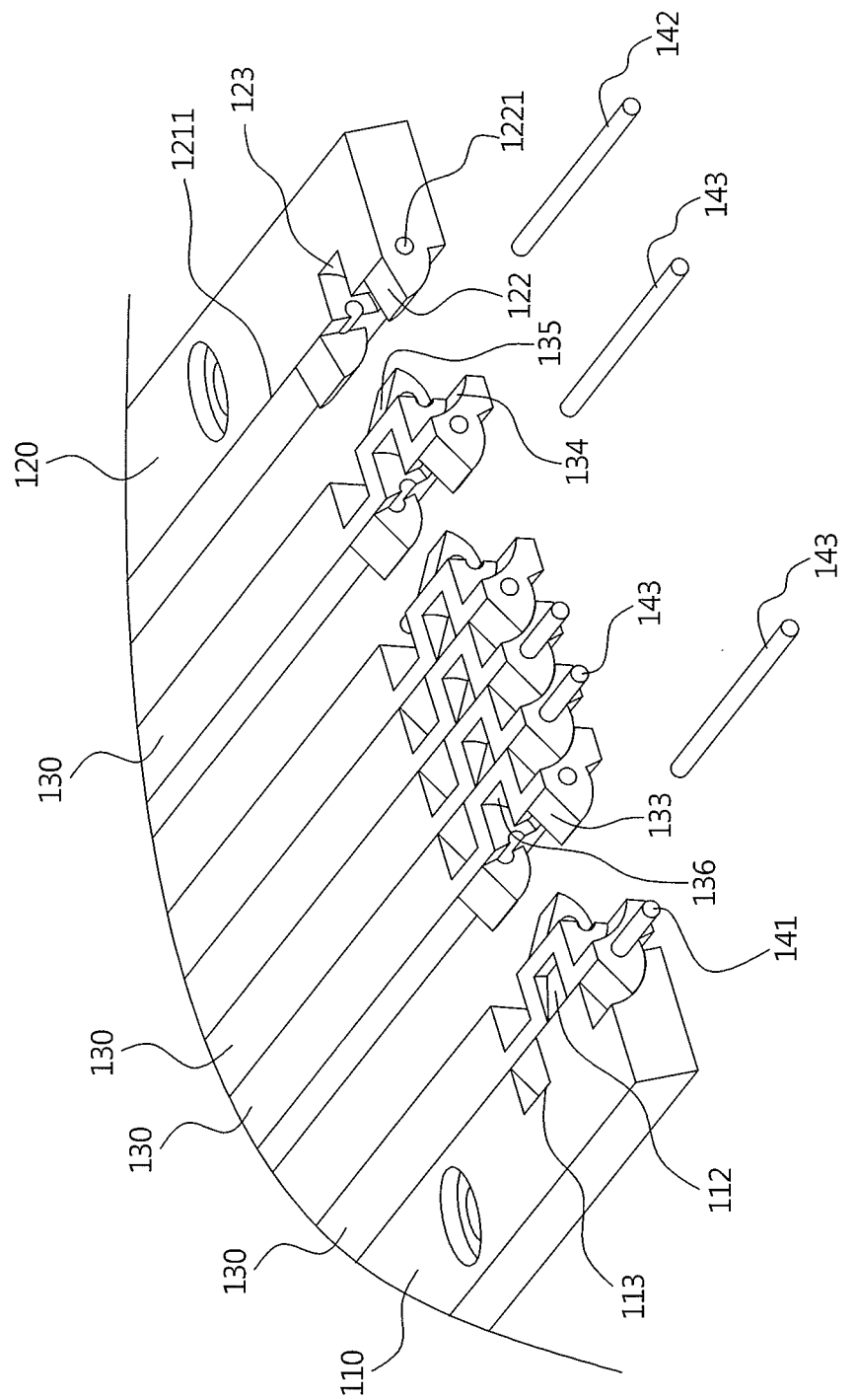
FIG. 3 illustrates an exploded view of the hinge of FIG. 2 at another viewing angle.

Please refer to FIG. 2 and FIG. 3. FIG. 2 illustrates an exploded view of the hinge 100 of the electronic device 20 of FIG. 1 at 180 degrees. FIG. 3 illustrates an exploded view of the hinge 100 of FIG. 2 at another viewing angle. While the electronic device 20 is at 180 degrees, the hinge is accordingly at 180 degrees. In the embodiment, the hinge 100 includes a first fixing member 110, a second fixing member 120, a plurality of connection members 130, a first axle 141, a second axle 142, and a third axle 143. Each of the connection members 130 includes a first side 131 and a second side 132 opposite with each other. A first slide block 133 is formed on a first position of the first side 131. A first arc surface 134 is formed on the second side 132 opposite with the first position. A second arc surface 136 is formed on a second position of the first side 131. A second slide block 135 is formed on the second side 132 opposite with the second position. Herein, a first circular hole 1331 penetrates through the first slide block 133. A first arc hole 1351 penetrates through the second slide block 135. The first fixing member 110 includes a third side 111. A third arc surface 113 corresponding to the first slide block 133 is formed on the third side 111 opposite with the first position. A third slide block 112 corresponding to the second arc surface 136 is formed on the third side 111 opposite with the second position. A second arc hole 1121 penetrates through the third slide block 112. The second fixing member 120 includes a fourth side 121. A fourth slide block 122 corresponding to the first arc surface 134 is formed on the fourth side 121 opposite with the first position. A fourth arc surface 123 corresponding to the second slide block 135 is formed on the fourth side 121 opposite with the second position. A second circular hole 1221 penetrates through the fourth slide block 122. The first axle 141 passes through the second arc hole 1121 of the first fixing member 110 and the first circular hole 1331 of the corresponding connection member 130. The second axle 142 passes through the second circular hole 1221 of the second fixing member 120 and the first arc hole 1351 of the corresponding connection member 130. The third axle 143 passes through the first circular hole 1331 and the first arc hole 1351 of each adjacent two of the connection members 130. The connection member 130 corresponding to the first fixing member 110 is the connection member 130 abutting the first fixing member 110, and the connection member 130 corresponding to the second fixing member 120 is the connection member 130 abutting the second fixing member 120.

As shown in FIG. 1 and FIG. 2, the first plate 21 is fixed to the first fixing member 110, and the second plate 22 is fixed to the second fixing member 120. When the electronic device 20 is relatively folded or spread, the first plate 21 drives the first fixing member 110, and the second plate 22 drives the second fixing member 120, such that the hinge 100 is also relatively folded or spread.

While the first fixing member 110 and the corresponding connection member 130 rotate relatively by the second arc hole 1121, a third top edge 1111 of the third side 111 of the first fixing member 110 abuts against a first top edge 1311 of the first side 131 of the corresponding connection member 130. Whether the electronic device 20 is spread to 180 degrees or is folded to 0 degrees, the third top edge 1111 and the first top edge 1311 keep abutting against to each other. In other words, a distance between the third top edge 1111 of the third side 111 of the first fixing member 110 and the second arc hole 1121 of the first fixing member 110 is H1, and a distance between the first top edge 1311 of the first side 131 and the first circular hole 1331 of the corresponding connection member 130 is h1. The distance H1 equals to the distance h1; therefore, the third top edge 1111 and the first top edge 1311 keep abutting against to each other. Analogously, a distance between a fourth top edge 1211 of the fourth side 121 and the second circular hole 1221 of the second fixing member 120 is h2, and a distance between a second top edge 1321 of the second side 132 and the first arc hole 1351 of the corresponding connection member 130 is H2. The distance H2 equals to the distance h2; therefore, while the second fixing member 120 and the corresponding connection member 130 rotate relatively by the first arc hole 1351, the fourth top edge 1211 of the fourth side 121 of the second fixing member 120 abuts against the second top edge 1321 of the second side 132 of the corresponding connection member 130. Whether the electronic device 20 is spread to 180 degrees or is folded to 0 degrees, the fourth top edge 1211 and the second top edge 1321 keep abutting against to each other. While each adjacent two of the connection members 130 rotate relatively by the first arc hole 1351, the first top edge 1311 of the first side 131 and the second top edge 1321 of the second side 132 of each adjacent two of the connection members 130 abut against each other. Whether the electronic device 20 is spread to 180 degrees or is folded to 0 degrees, the first top edge 1311 and the second top edge 1321 keep abutting against to each other. That is to say, H1=h1=H2=h2; therefore, during the process of the electronic device 20 being spread to 180 degrees or folded to 0 degrees, there is a virtual axis formed between the first top edge 1311 of each connection member 130 and the second top edge 1321 of the adjacent connection member 130. In the embodiment, there are multiple virtual axes. The hinge 100 rotates about these virtual axes to bend.

The third slide block 112 of the first fixing member 110 slidably contacts the second arc surface 136, and the first slide block 133 of the corresponding connection member 130 slidably contacts the third arc surface 113. The fourth slide block 122 of the second fixing member 120 slidably contacts the first arc surface 134, and the second slide block 135 of the corresponding connection member 130 slidably contacts the fourth arc surface 123. The first slide block 133 of each adjacent two of the connection members 130 slidably contacts the corresponding first arc surface 134, and the second slide block 135 of each adjacent two of the connection members 130 slidably contacts the corresponding second arc surface 136.

While the first fixing member 110 and the corresponding connection member 130 rotate relatively, the first axle 141 moves along an arc formed by the second arc hole 1121; while the second fixing member 120 and the corresponding connection member 130 rotate relatively, the second axle 142 moves along an arc formed by the corresponding first arc hole 1351; and while each adjacent two of the connection members 130 rotate relatively, the third axle 143 moves along an arc formed by the corresponding first arc hole 1351. In other words, a center of an arc formed by the first arc hole 1351 corresponding to the second fixing member 120 is on an axis formed by the corresponding second top edge 1321 and the fourth top edge 1211. The axis is formed mutually by the second top edge 1321 and the fourth top edge 1211 keeping abutting each other. A center of an arc formed by the second arc hole 1121 corresponding to the first fixing member 110 is on an axis formed by the third top edge 1111 and the corresponding first top edge 1311. The axis is formed mutually by the third top edge 1111 and the first top edge 1311 keeping abutting each other. A center of an arc formed by the first arc hole 1351 of each adjacent two of the connection members 130 is on an axis formed by the corresponding first top edge 1311 and the second top edge 1321. The axis is formed mutually by the corresponding first top edge 1311 and the second top edge 1321 keeping abutting each other.

Based upon the aforementioned structure, while the first axle 141 moves along the arc formed by the second arc hole 1121, this means that the first axle 141 moves around the axis formed by the third top edge 1111 and the corresponding first top edge 1311, and the first fixing member 110 and the corresponding connection member 130 rotate relatively about an axis of rotation formed by the third top edge 1111 and the corresponding first top edge 1311, whereby the third top edge 1111 and the corresponding first top edge 1311 may keep abutting each other. While the second axle 142 moves along an arc formed by the corresponding first arc hole 1351, this means that the second axle 142 moves around the axis formed by the fourth top edge 1211 and the corresponding second top edge 1321, and the second fixing member 120 and the corresponding connection member 130 rotate relatively about an axis of rotation formed by the fourth top edge 1211 and the corresponding second top edge 1321, whereby the fourth top edge 1211 and the corresponding second top edge 1321 can keep abutting each other. While the third axle 143 moves along an arc formed by the corresponding first arc hole 1351, this means that the third axle 143 moves around the axis formed by the first top edge 1311 and the second top edge 1321 of each adjacent two of the connection members 130, and each adjacent two of the connection members 130 rotate relatively about an axis of rotation formed by the first top edge 1311 and the second top edge 1321, whereby the first top edge 1311 and the second top edge 1321 adjacent to each other can keep abutting each other.

In the embodiment, the number of the first slide block 133 of each of the connection members 130 is two, and the second arc surface 136 of each of the connection members 130 is between the two corresponding first slide blocks 133. The number of the first arc surfaces 134 of each of the connection members 130 is two, and the second slide block 135 of each of the connection members 130 is between the two corresponding first arc surfaces 134. The number of the third arc surfaces 113 is two, and the third slide block 112 is between the two third arc surfaces 113. The number of the fourth slide block 122 is two, and the fourth arc surface 123 is between the two fourth slide blocks 122. Based upon the above design, relative rotations between each adjacent two of the connection members 130, between the first fixing member 110 and the corresponding connection member 130, and between the second fixing member 120 and the corresponding connection member 130 can be more stable.

Figure 4:
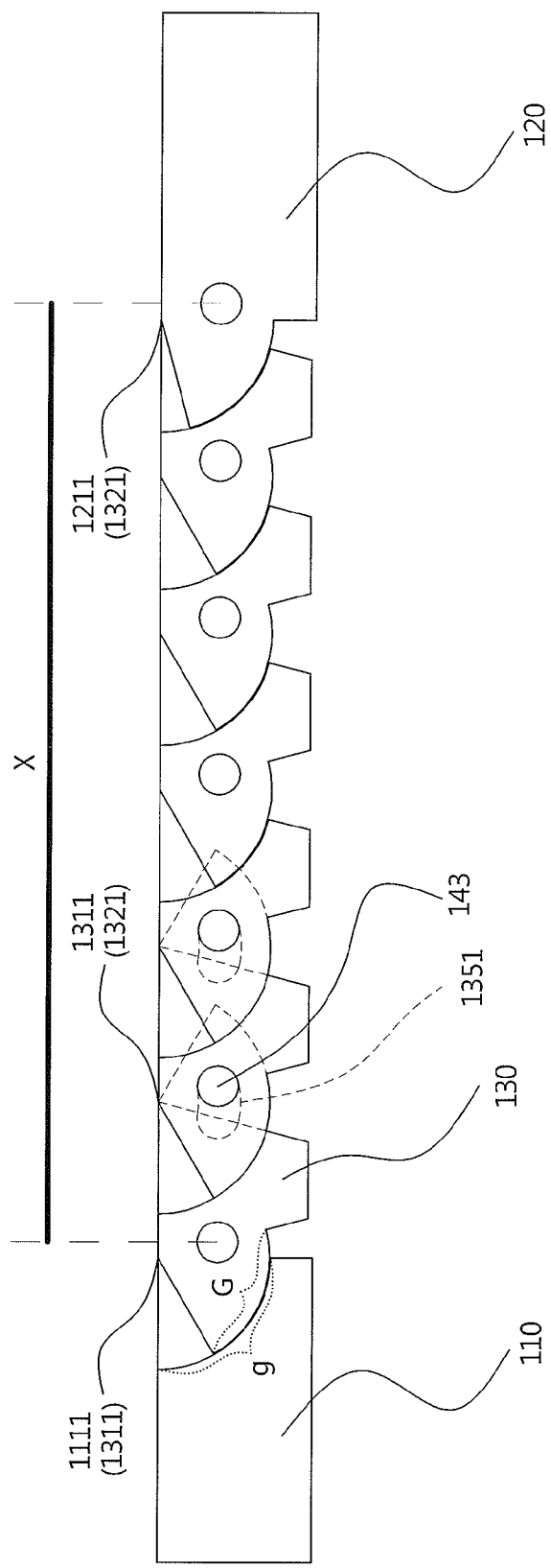
FIG. 4 illustrates a front view of the hinge of the electronic device of FIG. 1 at 180 degrees.
Figure 5:
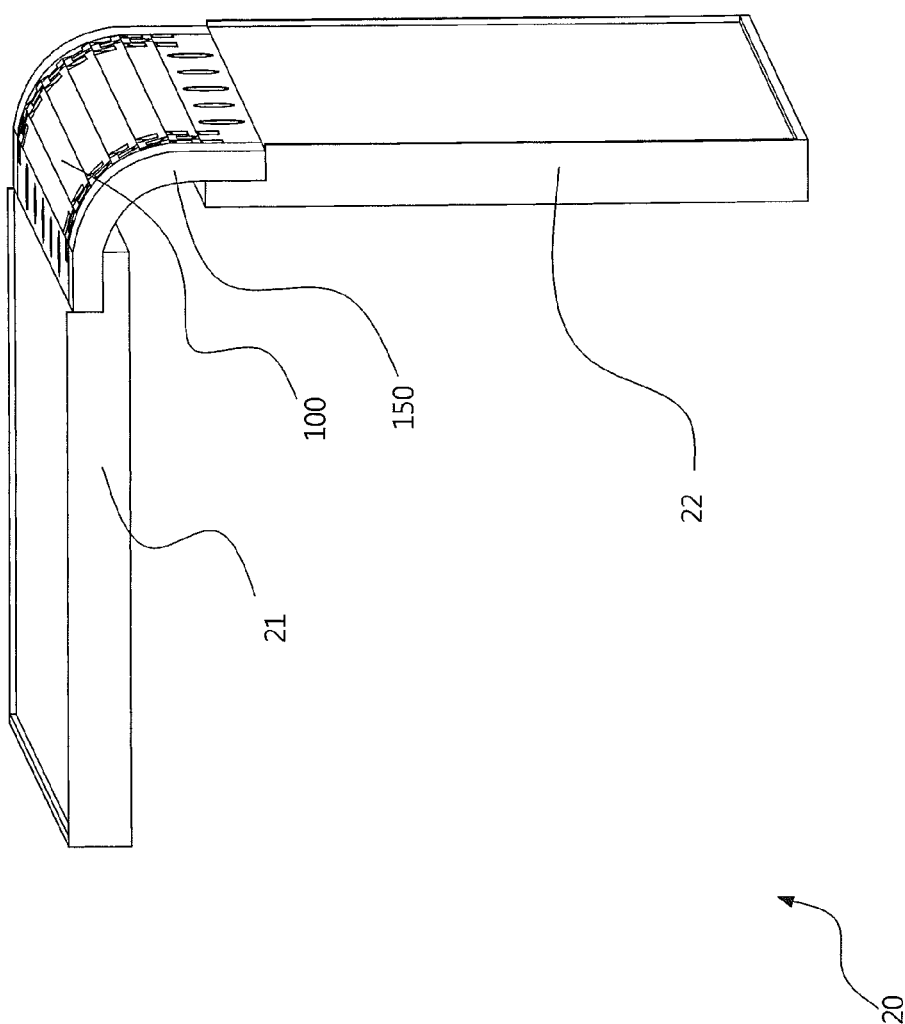
FIG. 5 illustrates a perspective view of the electronic device of FIG. 1 at 90 degrees.
Figure 6:
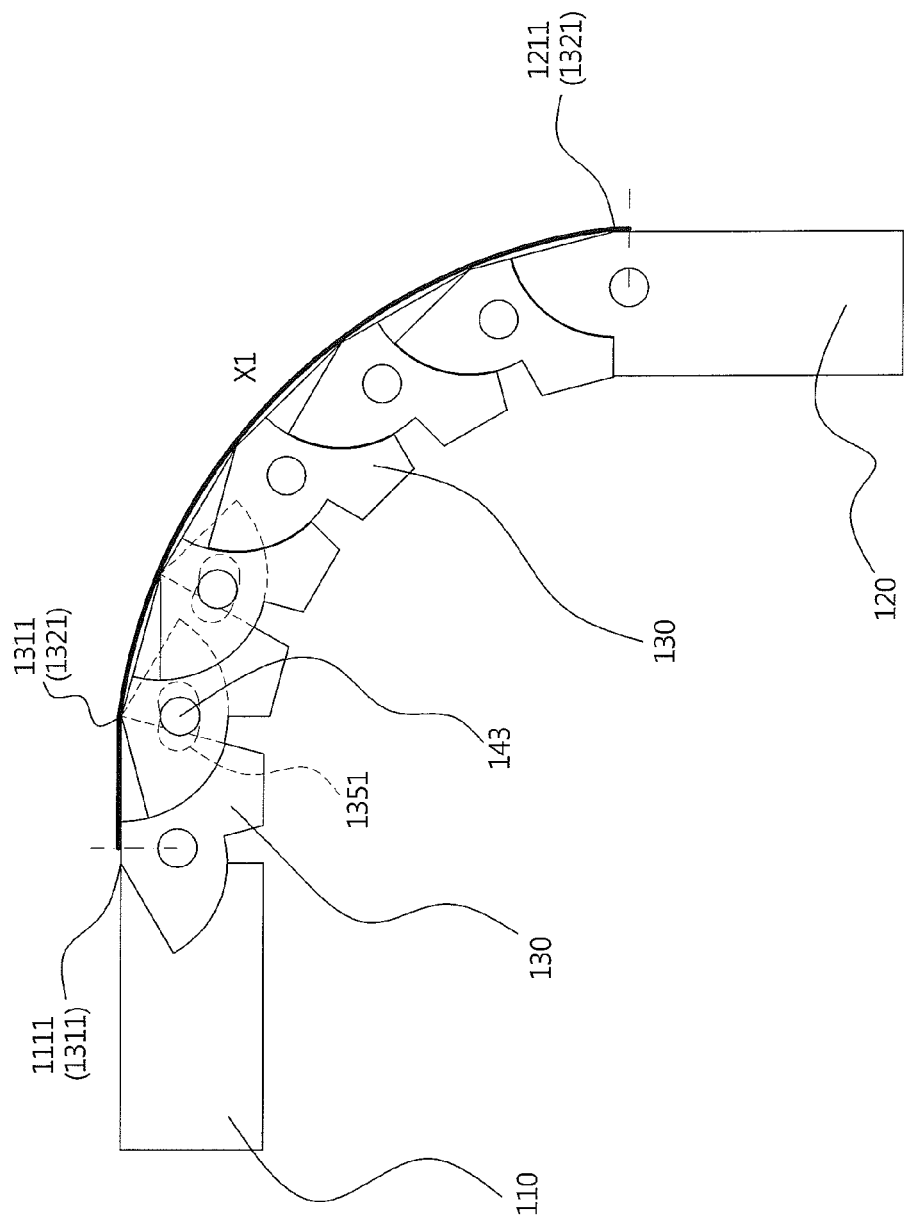
FIG. 6 illustrates a front view of the hinge of the electronic device of FIG. 5 at 90 degrees.
Figure 8:
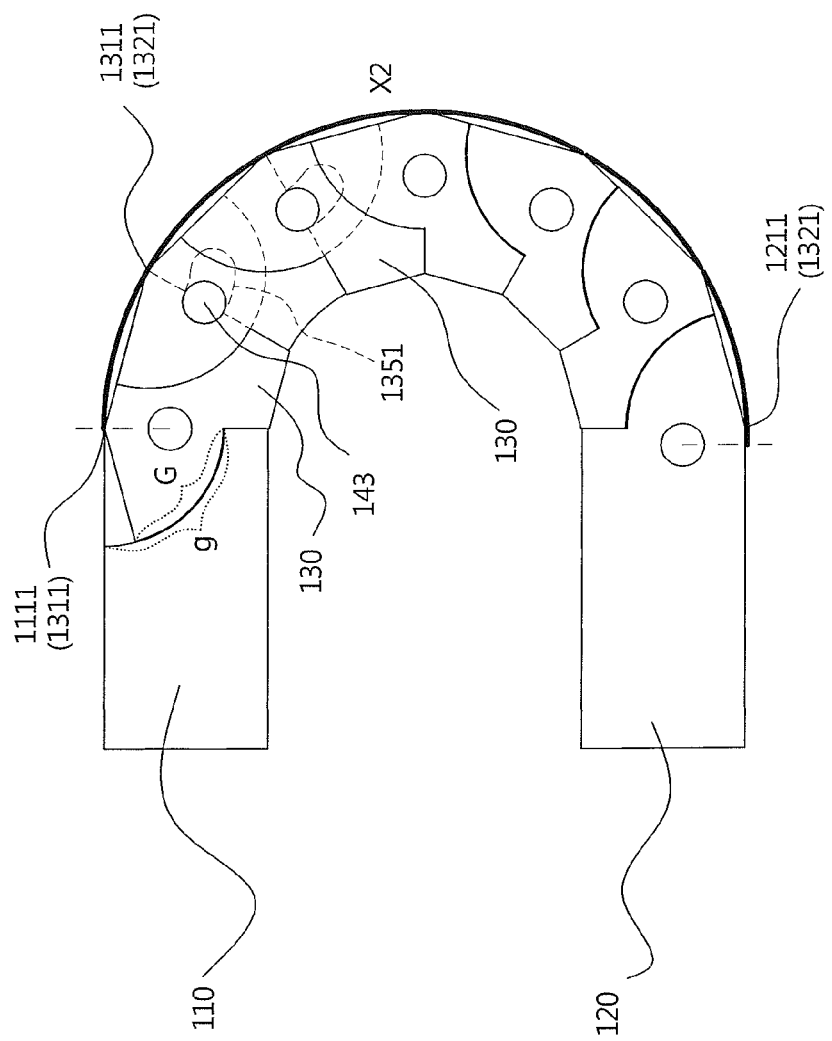
FIG. 8 illustrates a front view of the hinge of the electronic device of FIG. 7 at 0 degrees.

Please refer to FIG. 4 to FIG. 8. FIG. 4 illustrates a front view of the hinge 100 of the electronic device 20 of FIG. 1 at 180 degrees. FIG. 5 illustrates a perspective view of the electronic device 20 of FIG. 1 at 90 degrees. FIG. 6 illustrates a front view of the hinge 100 of the electronic device 20 of FIG. 5 at 90 degrees. FIG. 7 illustrates a perspective view of the electronic device 20 of FIG. 1 at 0 degrees. FIG. 8 illustrates a front view of the hinge 100 of the electronic device 20 of FIG. 7 at 0 degrees. As shown in FIG. 1, FIG. 5, and FIG. 7, these drawings relate to, in sequence, the electronic device 20 being at 180 degrees, being folded to 90 degrees, and being folded to 0 degrees. As shown in FIGS. 4, 6, and 8, these drawings relate to the hinge 100 being accordingly at 180 degrees, 90 degrees, and 0 degrees, respectively.

In some embodiments, the hinge 100 further includes a torque member 150. When the electronic device 20 is relatively folded or relatively spread between 0 degrees and 180 degrees, the torque member 150 provides friction force to the hinge 100. For example, the torque member 150 may include elastic units (not shown) enclosing and being fixed to ends of the first axle 141, the second axle 142, and the third axle 143. The elastic units may be configured to apply force (resilience generated by compressing the elastic units) on sides of the first fixing member 110, the connection members 130, and the second fixing member 120. Friction force would be generated between the elastic units, the first fixing member 110, the connection members 130, and the second fixing member 120. As a result, certain torque is required in order to have the electronic device 20 relatively folded or spread. Choice and design of the torque member 150 can be made by prior arts, and there is no need to go into details.

As shown in FIGS. 4, 6, and 8, during the process that the hinge 100 is bended from 180 degrees to 0 degrees (or bended from 0 degrees to 180 degrees), the first fixing member 110 and the corresponding connection member 130 rotate relatively, and each adjacent two of the connection members 130 also rotate relatively. In addition, the first axle 141 moves forward and backward along the arc between two ends of the second arc hole 1121, the second axle 142 moves forward and backward along the arc between two ends of the first arc hole 1351, and the third axle 143 moves forward and backward along the arc between two ends of the corresponding first arc hole 1351. The third top edge 1111 and first top edge 1311 adjacent to each other, the first top edge 1311 and the second top edge 1321 adjacent to each other, and the second top edge 1321 and the fourth top edge 1211 adjacent to each other would keep abutting against (being connected with or contacting) each other between 0 degrees and 180 degrees. In other words, the outer periphery of the hinge 100 (an upper edge as shown in FIG. 4) would keep fixed length so as to ensure that the flexible display member wouldn't be stretched or loosed by the electronic device 20 being folded or spread.

As shown in FIG. 4, a length between the third top edge 1111 of the first fixing member 110 and the forth top edge 1211 of the second fixing member 120 is defined as a length X. That is to say, while the hinge 100 is at 180 degrees, a length of the outer periphery of the connection members 130 (i.e., a length of the upper edge of the connection members 130 in a horizontal direction as shown in FIG. 4) is the length X. As shown in FIG. 6, while the hinge 100 is at 90 degrees, a length of the outer periphery of the connection members 130 (i.e., an arc length of the outer periphery of the connection members 130 as shown in FIG. 6) is defined as a length X1. As shown in FIG. 8, while the hinge 100 is at 0 degrees, a length of the outer periphery of the connection members 130 (i.e., an arc length of the outer periphery of the connection members 130 as shown in FIG. 8) is defined as a length X2. No matter what degrees that the electronic device 20 and the hinge 100 are relatively spread to or folded to, the third top edge 1111 and first top edge 1311 adjacent to each other, the first top edge 1311 and the second top edge 1321 adjacent to each other, and the second top edge 1321 and the fourth top edge 1211 adjacent to each other would keep abutting against each other without separating or interlacing; therefore, the length of the outer periphery of the connection members 130 wouldn't change. That is to say, the lengths X, X1, and X2 of FIGS. 4, 6, and 8 are all the same. As a result, while the electronic device 20 is relatively folded to 0 degrees, the flexible display member wouldn't be over stretched to be damaged; while the electronic device 20 is relatively spread to 180 degrees, the flexible display member wouldn't be over loosed to hump to negatively affect the displaying.

Moreover, in a preferred embodiment, as shown in FIG. 2 and FIG. 4, an arc length G of the first slide block 133, the second slide block 135, the third slide block 112, and the fourth slide block 122 shall be slightly less than an arc length g of the corresponding third arc surface 113, the corresponding fourth arc surface 123, the corresponding second arc surface 136, and the corresponding first arc surface 134. Thus, while the hinge 100 is relatively folded to 0 degrees, as shown in FIG. 8, the first slide block 133, the second slide block 135, the third slide block 112, and the fourth slide block 122 wouldn't be protruded from a face of the corresponding arc surface. Therefore, the length X2 wouldn't be interfered (by the protrusion of the slide blocks).

In the embodiment, the number of the connection members 130 is six. In a case that the first fixing member 110 and the corresponding connection member 130 is one set, each adjacent two of the connection members 130 is one set (totally five sets), and the second fixing member 120 and the corresponding connection member 130 is one set, there are seven sets of components would relatively rotate. Each set is configured to be responsible for a rotation angel of 25-26 degrees. In other words, the configuration allow the hinge 100 to meet an overall rotation angle about 180 degrees. In the embodiment, the overall rotation angle is, but is not limited to, 180 degrees. In another embodiment, the number of the connection members 130 is five, and thus there are six sets of components would relatively rotate. In a case that each set is configured to be responsible for a rotation angel of 30 degrees, the configuration allow the hinge 100 to meet an overall rotation angle just 180 degrees. In other embodiments. Different configurations and different number of sets (e.g., different number of the connection members 130) allow the hinge 100 to meet a required rotation angle, which may be a rotation angle of 180 degrees or a rotation angle different from 180 degrees. In other embodiments, in a cast that each set is configured to be responsible for a rotation angle different from 30 degrees, the hinge 100 may meet a required rotation angle, which may be a rotation angle of 180 degrees or a rotation angle different from 180 degrees.

Figure 9:
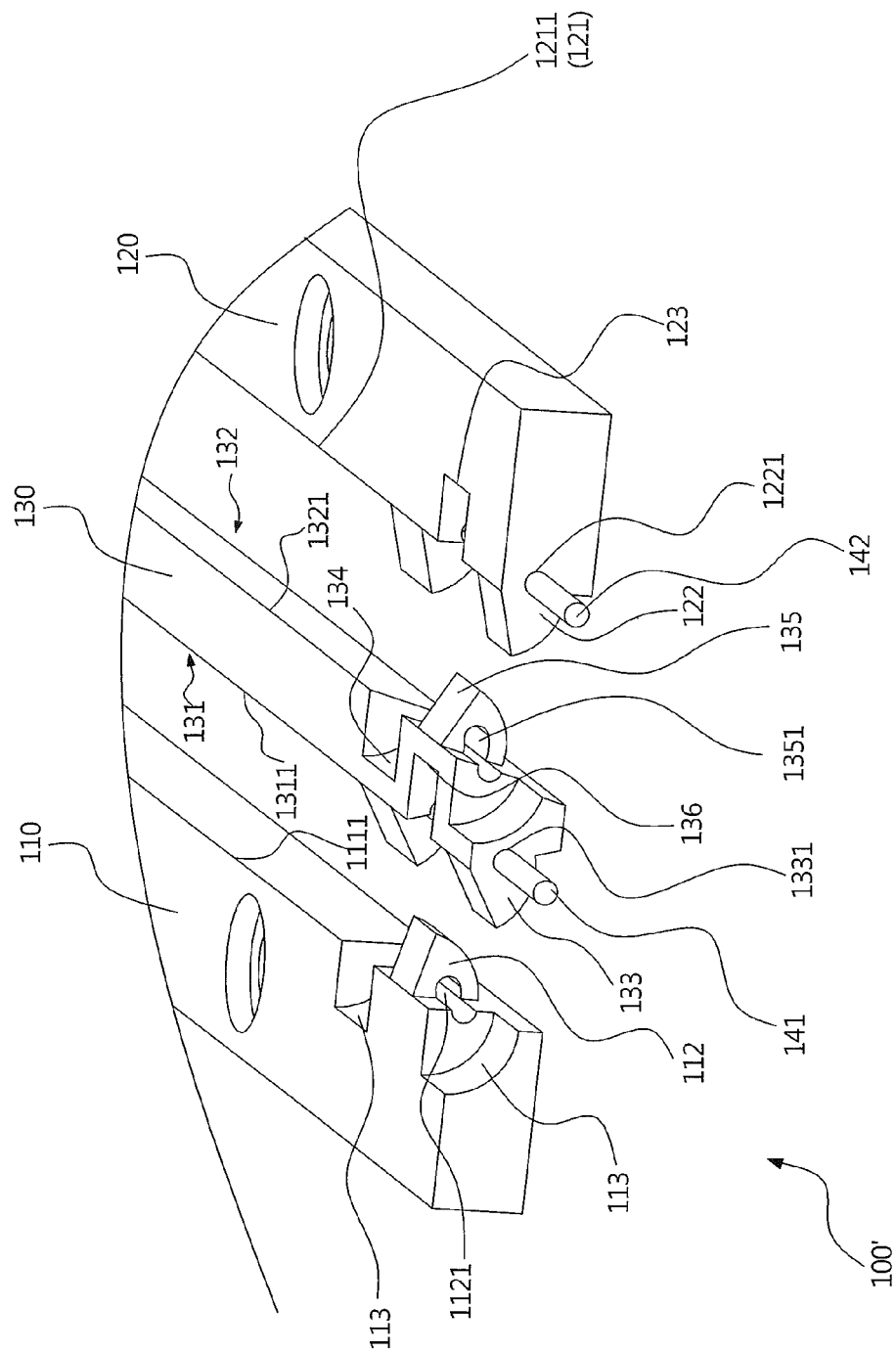
FIG. 9 illustrates an exploded view of a hinge at 180 degrees according to another embodiment of the present invention.

Please refer to FIG. 9. FIG. 9 illustrates an exploded view of a hinge 100' at 180 degrees according to another embodiment of the present invention. Differences between the hinge 100' of FIG. 9 and the hinge 100 of FIG. 1 to FIG. 8 are that the hinge 100' of FIG. 9 merely includes one connection member 130 and has no third axle 143. The following illustrates the main structure of the hinge 100' of FIG. 9, and details and operation principles can be referred to the above description and FIG. 1 to FIG. 8. The hinge 100' includes a first fixing member 110, a second fixing member 120, a connection member 130, a first axle 141, and a second axle 142. The connection member 130 includes a first side 131 and a second side 132 opposite with each other. A first slide block 133 is formed on a first position of the first side 131. A first arc surface 134 is formed on the second side 132 opposite with the first position. A second arc surface 136 is formed on a second position of the first side 131. A second slide block 135 is formed on the second side 132 opposite with the second position. A first circular hole 1331 penetrates through the first slide block 133. A first arc hole 1351 penetrates through the second slide block 135. The first fixing member 110 includes a third side 111. A third arc surface 113 corresponding to the first slide block 133 is formed on the third side 111 opposite with the first position. A third slide block 112 corresponding to the second arc surface 136 is formed on the third side 111 opposite with the second position. A second arc hole 1121 penetrates through the third slide block 112. The second fixing member 120 includes a fourth side 121. A fourth slide block 122 corresponding to the first arc surface 134 is formed on the fourth side 121 opposite with the first position. A fourth arc surface 123 corresponding to the second slide block 135 is formed on the fourth side 121 opposite with the second position. A second circular hole 1221 penetrates through the fourth slide block 122. The first axle 141 passes through the second arc hole 1121 and the first circular hole 1331. The second axle 142 passes through the second circular hole 1221 and the first arc hole 1351.

While the first fixing member 110 and the connection member 130 rotate relatively by the second arc hole 1121, a third top edge 1111 of the third side 111 of the first fixing member 110 abuts against a first top edge 1311 of the first side 131 of the connection member 130. No matter what degrees that the hinge 100' is folded to or spread to, the third top edge 1111 and the first top edge 1311 would keep abutting against each other. While the second fixing member 120 and the connection member 130 rotate relatively by the first arc hole 1351, a fourth top edge 1211 of the fourth side 121 of the second fixing member 120 abuts against a second top edge 1321 of the second side 132 of the connection member 130. No matter what degrees that the hinge 100' is folded to or spread to, the fourth top edge 1211 and the second top edge 1321 would keep abutting against each other.

The third slide block 112 and the first slide block 133 of the first fixing member 110 and the connection member 130 slidably contact the second arc surface 136 and the third arc surface 113, respectively. The fourth slide block 122 and the second slide block 135 of the second fixing member 120 and the connection member 130 slidably contact the first arc surface 134 and the fourth arc surface 123, respectively.

While the first fixing member 110 and the connection member 130 rotate relatively, the first axle 141 moves along an arc formed by the second arc hole 1121. While the second fixing member 120 and the connection member 130 rotate relatively, the second axle 142 moves along an arc formed by the first arc hole 1351. In other words, a center of an arc formed by the first arc hole 1351 is on an axis formed by the second top edge 1321 and the fourth top edge 1211. The axis is formed mutually by the second top edge 1321 and the fourth top edge 1211 keeping abutting each other. A center of an arc formed by the second arc hole 1121 is on an axis formed by the third top edge 1111 and the first top edge 1311. The axis is formed mutually by the third top edge 1111 and the first top edge 1311 keeping abutting each other.

Based upon the aforementioned structure, while the first axle 141 moves along the arc formed by the second arc hole 1121, this means that the first axle 141 moves around the axis formed by the third top edge 1111 and the first top edge 1311, and the first fixing member 110 and the connection member 130 rotate relatively about an axis of rotation formed by the third top edge 1111 and the first top edge 1311, whereby the third top edge 1111 and the first top edge 1311 may keep abutting each other. While the second axle 142 moves along an arc formed by the first arc hole 1351, this means that the second axle 142 moves around the axis formed by the fourth top edge 1211 and the second top edge 1321, and the second fixing member 120 and the connection member 130 rotate relatively about an axis of rotation formed by the fourth top edge 1211 and the second top edge 1321, whereby the fourth top edge 1211 and the second top edge 1321 can keep abutting each other.

In the embodiment, the number of the first slide block 133 is two, and the second arc surface 136 is between the two first slide blocks 133. The number of the first arc surfaces 134 is two, and the second slide block 135 is between the two first arc surfaces 134. The number of the third arc surfaces 113 is two, and the third slide block 112 is between the two third arc surfaces 113. The number of the fourth slide block 122 is two, and the fourth arc surface 123 is between the two fourth slide blocks 122. Based upon the above design, relative rotations between the connection member 130 and the first fixing member 110 and between the connection member 130 and the second fixing member 120 can be more stable.

Concisely, according to the hinge and the electronic device using the same of the embodiments of the present invention, while the first plate and the second plate of the electronic device are folded and spread relatively, a length of an outer periphery of the connection member(s) of the hinge remains the same, such that there would be no influence to the flexible display member attached to the first plate, the second plate, and the outer periphery of the connection member(s). Such influences, for example, may result in the flexible display member being over stretched to cause damage or the flexible display member being over loosed to hump to negatively affect the displaying.

While the present invention has been described by way of example and in terms of the preferred embodiments, it is to be understood that the present invention needs not be limited to the disclosed embodiments. For anyone skilled in the art, various modifications and improvements within the spirit of the present invention are covered under the scope of the present invention. The covered scope of the present invention is based on the appended claims.

What is claimed is:
1. A hinge comprising:
a connection member comprising a first side and a second side opposite with each other, wherein a first slide block is formed on a first position of the first side, a first arc surface is formed on the second side opposite with the first position, a second arc surface is formed on a second position of the first side, and a second slide block is formed on the second side opposite with the second position, wherein a first circular hole penetrates through the first slide block, and a first arc hole penetrates through the second slide block;
a first fixing member comprising a third side, wherein a third arc surface corresponding to the first slide block is formed on the third side opposite with the first position, and a third slide block corresponding to the second arc surface is formed on the third side opposite with the second position, wherein a second arc hole penetrates through the third slide block;
a second fixing member comprising a fourth side, wherein a fourth slide block corresponding to the first arc surface is formed on the fourth side opposite with the first position, and a fourth arc surface corresponding to the second slide block is formed on the fourth side opposite with the second position, wherein a second circular hole penetrates through the fourth slide block;
a first axle passing through the second arc hole and the first circular hole; and
a second axle passing through the second circular hole and the first arc hole;
wherein, while the first fixing member and the connection member rotate relatively by the second arc hole, a third top edge of the third side of the first fixing member abuts against a first top edge of the first side of the connection member; while the second fixing member and the connection member rotate relatively by the first arc hole, a fourth top edge of the fourth side of the second fixing member abuts against a second top edge of the second side of the connection member.
2. The hinge of claim 1, wherein while the first fixing member and the connection member rotate relatively, the first axle moves along an arc formed by the second arc hole;

and while the second fixing member and the connection member rotate relatively, the second axle moves along an arc formed by the first arc hole.

3. The hinge of claim 1, wherein a center of an arc formed by the first arc hole is on an axis formed by the second top edge and the fourth top edge; and a center of an arc formed by the second arc hole is on an axis formed by the third top edge and the first top edge.

4. The hinge of claim 1, wherein the first fixing member and the connection member rotate relatively about an axis of rotation formed by the third top edge and the first top edge; and the second fixing member and the connection member rotate relatively about an axis of rotation formed by the fourth top edge and the second top edge.

5. The hinge of claim 1, wherein the third slide block and the first slide block of the first fixing member and the connection member slidably contact the second arc surface and the third arc surface, respectively; and the fourth slide block and the second slide block of the second fixing member and the connection member slidably contact the first arc surface and the fourth arc surface, respectively.

6. The hinge of claim 1, wherein the number of the first slide block is two, the second arc surface is between the two first slide blocks; the number of the first arc surfaces is two, the second slide block is between the two first arc surfaces; the number of the third arc surfaces is two, the third slide block is between the two third arc surfaces; and the number of the fourth slide block is two, the fourth arc surface is between the two fourth slide blocks.

7. A hinge comprising:
   a plurality of connection members, each of the connection members comprising a first side and a second side opposite with each other, wherein a first slide block is formed on a first position of the first side, a first arc surface is formed on the second side opposite with the first position, a second arc surface is formed on a second position of the first side, and a second slide block is formed on the second side opposite with the second position, wherein a first circular hole penetrates through the first slide block, and a first arc hole penetrates through the second slide block;
   a first fixing member comprising a third side, wherein a third arc surface corresponding to the first slide block is formed on the third side opposite with the first position, and a third slide block corresponding to the second arc surface is formed on the third side opposite with the second position, wherein a second arc hole penetrates through the third slide block;
   a second fixing member comprising a fourth side, wherein a fourth slide block corresponding to the first arc surface is formed on the fourth side opposite with the first position, and a fourth arc surface corresponding to the second slide block is formed on the fourth side opposite with the second position, wherein a second circular hole penetrates through the fourth slide block;
   a first axle passing through the second arc hole of the first fixing member and the first circular hole of the corresponding connection member; and
   a second axle passing through the second circular hole of the second fixing member and the first arc hole of the corresponding connection member;
   a third axle passing through the first circular hole and the first arc hole of each adjacent two of the connection members,
   wherein, while the first fixing member and the corresponding connection member rotate relatively by the second arc hole, a third top edge of the third side of the first fixing member abuts against a first top edge of the first side of the corresponding connection member; while the second fixing member and the corresponding connection member rotate relatively by the first arc hole, a fourth top edge of the fourth side of the second fixing member abuts against a second top edge of the second side of the corresponding connection member; and while each adjacent two of the connection members rotate relatively by the first arc hole, the first top edge of the first side and the second top edge of the second side of each adjacent two of the connection members abut against each other.

8. The hinge of claim 7, wherein while the first fixing member and the corresponding connection member rotate relatively, the first axle moves along an arc formed by the second arc hole; while the second fixing member and the corresponding connection member rotate relatively, the second axle moves along an arc formed by the corresponding first arc hole; and while each adjacent two of the connection members rotate relatively, the third axle moves along an arc formed by the first arc hole.

9. The hinge of claim 7, wherein a center of an arc formed by the first arc hole corresponding to the second fixing member is on an axis formed by the second top edge and the fourth top edge; a center of an arc formed by the second arc hole is on an axis formed by the third top edge and the corresponding first top edge; and a center of an arc formed by the first arc hole of each adjacent two of the connection members is on an axis formed by the first top edge and the second top edge.

10. The hinge of claim 7, wherein the first fixing member and the corresponding connection member rotate relatively about an axis of rotation formed by the third top edge and the corresponding first top edge; the second fixing member and the corresponding connection member rotate relatively about an axis of rotation formed by the fourth top edge and the corresponding second top edge; and each adjacent two of the connection members rotate relatively about an axis of rotation formed by the first top edge and the second top edge.

11. The hinge of claim 7, wherein the third slide block and the first slide block of the first fixing member and the connection member slidably contact the second arc surface and the third arc surface, respectively; the fourth slide block and the second slide block of the second fixing member and the corresponding connection member slidably contact the first arc surface and the fourth arc surface, respectively; and the first slide block and the second slide block of each adjacent two of the connection members slidably contact the corresponding first arc surface and the second arc surface, respectively.

12. The hinge of claim 7, wherein the number of the first slide block of each of the connection members is two, the second arc surface of each of the connection members is between the two corresponding first slide blocks; the number of the first arc surfaces of each of the connection members is two, the second slide block of each of the connection members is between the two corresponding first arc surfaces; the number of the third arc surfaces is two, the third slide block is between the two third arc surfaces; and the number of the fourth slide block is two, the fourth arc surface is between the two fourth slide blocks.

13. An electronic device comprising:
   a hinge of claim 7;
   a first plate fixed to the first fixing member; and
   a second plate fixed to the second fixing member.

* * * * *